(12) United States Patent
Mizusaki et al.

(10) Patent No.: US 7,018,963 B2
(45) Date of Patent: Mar. 28, 2006

(54) WATER-SOLUBLE SURFACTANT COMPOSITION

(75) Inventors: Toru Mizusaki, Takefu (JP); Shuichiro Shinohara, Takefu (JP)

(73) Assignee: Nissin Chemical Industry Co., Ltd., Fukui-ken (JP)

( * ) Notice: Subject to any disclaimer, the term of this patent is extended or adjusted under 35 U.S.C. 154(b) by 65 days.

(21) Appl. No.: 10/852,095

(22) Filed: May 25, 2004

(65) Prior Publication Data

US 2004/0242447 A1    Dec. 2, 2004

(30) Foreign Application Priority Data

May 26, 2003  (JP) .............................. 2003-147213
Feb. 20, 2004  (JP) .............................. 2004-043954

(51) Int. Cl.
    *C11D 1/68*    (2006.01)
    *C11D 1/72*    (2006.01)
    *C11D 3/37*    (2006.01)

(52) U.S. Cl. ...................... 510/170; 510/174; 510/175; 510/360; 510/413; 510/421; 510/475; 510/505; 510/535

(58) Field of Classification Search ................ 510/170, 510/174, 175, 360, 413, 421, 475, 505, 535
See application file for complete search history.

(56) References Cited

U.S. PATENT DOCUMENTS 6,689,818 B1 * 2/2004 Nakamura et al. ............ 516/78
2004/0242447 A1 * 12/2004 Mizusaki et al. ........... 510/175

FOREIGN PATENT DOCUMENTS

| JP | 2002-348500 A |   | 12/2002 |
| JP | 2002348500 A  | * | 12/2002 |

* cited by examiner

*Primary Examiner*—Brian P. Mruk
(74) *Attorney, Agent, or Firm*—Birch, Stewart, Kolasch & Birch, LLP

(57) ABSTRACT

A water-soluble surfactant composition includes an aliphatic diol and a polyoxyalkylene alkyl ether. A 0.1 wt % aqueous solution of the surfactant composition has a contact angle of at most 60 degrees and a dynamic surface tension at both 1 Hz and 10 Hz of at most 50 mN/m. When used in printing inks and paper coatings, this composition provides excellent wettability, penetrability, foam inhibition and dispersibility, is compatible with environmental concerns, and has no adverse effects on printing and coating equipment.

1 Claim, No Drawings

WATER-SOLUBLE SURFACTANT COMPOSITION

This Non-provisional application claims priority under 35 U.S.C. § 119(a) on Patent Application No(s). 2003-147213 and 2004-043954 filed in Japan on May 26, 2003 and Feb. 20, 2004, respectively, the entire contents of which are hereby incorporated by reference.

TECHNICAL FIELD

The present invention relates to water-soluble surfactant compositions.

BACKGROUND ART

Due in part to recent environmental concerns, water-based products are seeing increasing use in the printing industry, the papermaking industry and the coatings industry. However, aqueous systems are slow-drying and result in lower production speeds than solvent systems. It has thus been necessary to constantly adapt aqueous systems to the higher speeds entailed by productivity improvements, creating a desire for performance enhancements in inks and paper coatings suitable for high-speed printing and high-speed coating. Such circumstances have led to a need, in connection with water-based inks and water-based coatings, for surfactants which, in order to impart substrate wettability, penetrability and dispersibility, possess an excellent surface tension-lowering ability. In selecting a surfactant, it is very important that the resulting system have a static surface tension when at rest, and also, given the above productivity enhancement-driven need for higher printing speeds, that the system have a low dynamic surface tension during high-speed use.

Acetylene glycol-type surfactants, such as acetylene glycol and its ethylene oxide derivatives, are currently used as wetting agents and dispersing agents in inks and coatings because they achieve a balance in their ability to lower both the static surface tension and the dynamic surface tension, are substantially free of the drawbacks of existing nonionic and anionic surfactants, and are also foam-inhibiting.

Because of such problems as their low solubility in water or their solid state at normal temperatures, acetylene glycol-type surfactants are used together with a solubilizing agent, such as polyethylene glycol, polyoxyethylene nonyl phenyl ether, or polyoxy(ethylene-propylene) block polymer— which is compatible as well with environmental concerns. This surfactant-solubilizer combination, when added to a water-base ink or paper coating, imparts the system with self-emulsifiability.

However, because the triple bonds in the surfactant structure have a strong affinity to metals, when such formulations of an acetylene glycol-type surfactant with a solubilizer are used in inkjet inks, the ink nozzles clog due to surfactant residues. Similarly, when such formulations are incorporated into paper coatings, residues remain on the coating rolls, causing uneven coating.

Prior-art references relating to the present invention include JP-A 2002-348500.

SUMMARY OF THE INVENTION

It is therefore an object of the invention to provide water-soluble surfactant compositions which have a low dynamic surface tension and thus exhibit excellent wettability, penetrability, foam inhibition and dispersibility, which are soluble in water and satisfy environmental concerns, and which moreover have no adverse effect on machinery and other equipment used in printing or coating.

We have discovered that when a composition of one or more aliphatic diol of formula (1) and/or formula (2) below with one or more polyoxyalkylene alkyl ether having formula (3) and/or formula (4) below and having a hydrophilic-lipophilic balance (HLB) within a specific range is used as an additive in water-based systems such as inks and paper coatings, the composition exhibits a low dynamic surface tension that confers excellent wettability, penetrability, foam inhibition and dispersibility, is compatible with environmental concerns, and has no adverse effects on machinery and other equipment used in connection with the system.

Accordingly, the invention provides a water-soluble surfactant composition which includes (A) 10 to 90 wt % of at least one aliphatic diol selected from among compounds of formula (1)

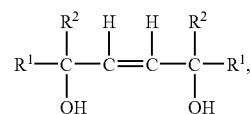
(1)

wherein $R^1$ and $R^2$ are each an alkyl of 1 to 5 carbons, and compounds of formula (2)

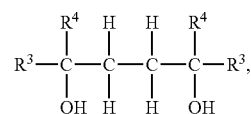
(2)

wherein $R^3$ and $R^4$ are each an alkyl of 1 to 5 carbons; and (B) 10 to 90 wt % of at least one polyoxyalkylene alkyl ether having a hydrophilic-lipophilic balance of 8 to 19 selected from among compounds of formula (3)

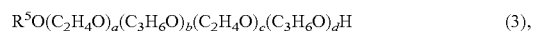
$$R^5O(C_2H_4O)_a(C_3H_6O)_b(C_2H_4O)_c(C_3H_6O)_dH \qquad (3),$$

wherein $R^5$ is an alkyl of 1 to 20 carbons, the letter a is an integer from 1 to 20, and b, c and d are each 0 or an integer from 1 to 20, and compounds of formula (4)

$$R^5O(C_3H_6O)_w(C_2H_4O)_x(C_3H_6O)_y(C_2H_4O)_zH \qquad (4),$$

wherein $R^5$ is as defined above, the letter w is an integer from 1 to 20, and x, y and z are each 0 or an integer from 1 to 20. The composition, when prepared as a 0.1 wt % aqueous solution thereof, has a contact angle 30 seconds after droplet deposition of at most 60 degrees and a dynamic surface tension at 1 Hz and 10 Hz of at most 50 mN/m each.

The water-soluble surfactant compositions of the invention have a low contact angle immediately after droplet deposition and also have a low dynamic surface tension. As a result, these surfactant compositions, when added to an ink or other water-based system, exhibit substrate wettability, penetrability, foam inhibition and dispersibility, are soluble in water, and satisfy environmental concerns. Moreover, they have no adverse effects on machinery and other equipment used in printing or coating. These qualities make the inventive water-based surfactant composition highly beneficial for practical purposes.

DETAILED DESCRIPTION OF THE INVENTION

Component A in the inventive water-soluble surfactant compositions is one or more aliphatic diol selected from among compounds of formulas (1) and (2) below.

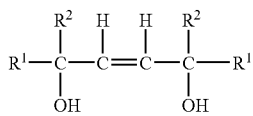
(1)

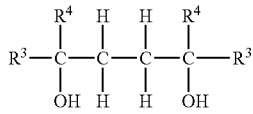
(2)

In the above formulas, $R^1$, $R^2$, $R^3$ and $R^4$ are each alkyls of 1 to 5 carbons.

Illustrative examples of aliphatic diols of formula (1) above include
2,5,8,11-tetramethyl-6-dodecen-5,8-diol,
5,8-dimethyl-6-dodecen-5,8-diol,
2,4,7,9-tetramethyl-5-decen-4,7-diol,
4,7-dimethyl-5-decen-4,7-diol,
2,3,6,7-tetramethyl-4-octen-3,6-diol and
3,6-dimethyl-4-octen-3,6-diol.

Illustrative examples of aliphatic diols of formula (2) above include
2,5,8,11-tetramethyl-6-dodecan-5,8-diol,
5,8-dimethyl-6-dodecan-5,8-diol,
2,4,7,9-tetramethyl-5-decan-4,7-diol,
4,7-dimethyl-5-decan-4,7-diol,
2,3,6,7-tetramethyl-4-octan-3,6-diol and
3,6-dimethyl-4-octan-3,6-diol.

These aliphatic diols may be used singly or as a mixture of two or more thereof. The amount of aliphatic diol used when preparing the water-soluble surfactant composition of the invention is 10 to 90 wt %, and preferably 20 to 80 wt %. At less than 10 wt %, the dynamic surface tension rises, which leads to crawling during high-speed printing and to poor printability when the composition is used in formulating an ink system. On the other hand, at more than 90 wt %, the solubility in water worsens, giving rise to agglomerates during formulation.

Component B formulated together with the aliphatic diol (component A) in the inventive water-soluble surfactant compositions is one or more polyoxyalkylene alkyl ether selected from among compounds of formula (3)

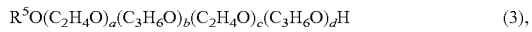
(3), wherein $R^5$ is an alkyl of 1 to 20 carbons, the letter a is an integer from 1 to 20, and b, c and d are each 0 or an integer from 1 to 20; and compounds of formula (4)

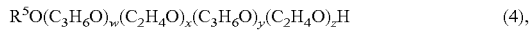
(4), wherein $R^5$ is as defined above, the letter w is an integer from 1 to 20, and x, y and z are each 0 or an integer from 1 to 20.

In the above formulas, $R^5$ is an alkyl of preferably 5 to 20 carbons, and more preferably 10 to 18 carbons; the sum a+b+c+d is preferably 5 to 30, and more preferably 5 to 25; and the sum w+x+y+z is preferably 5 to 30, and more preferably 5 to 25.

Specific examples of the polyoxyalkylene alkyl ether of formula (3) include

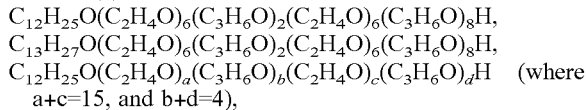

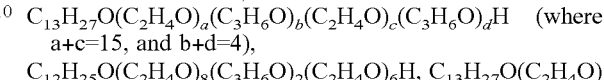 (where a+c=15, and b+d=4),

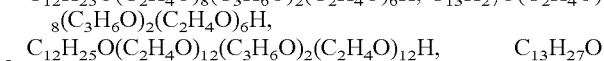 (where a+c=15, and b+d=4),

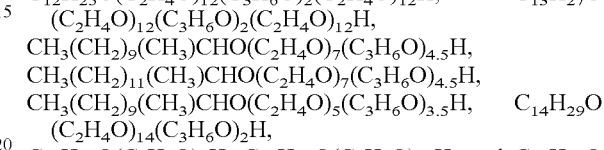

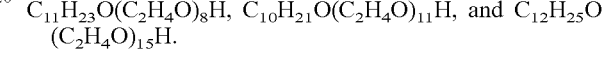

Specific examples of the polyoxyalkylene alkyl ether of formula (4) include

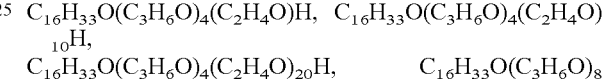

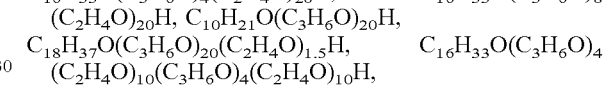

and $C_{16}H_{33}O(C_3H_6O)_4(C_2H_4O)_{10}(C_3H_6O)_4H$. Any of the above may be used singly or as mixtures of two or more thereof.

Component B has a hydrophilic-lipophilic balance (HLB) of 8 to 19, and preferably 9 to 17. At a value of less than 8, the hydrophobicity increases and solubility in water declines, so that sufficient water solubility is not achieved. On the other hand, at a value of more than 19, the dynamic surface tension is large, which means that when the composition is used in an ink system, the ink will be poorly absorbed and run.

The amount of Component B used when preparing the surfactant composition of the invention is 10 to 90 wt %, and preferably 15 to 70 wt %. At less than 10 wt %, sufficient solubilization of the aliphatic diol serving as component A does not occur, thus lowering the water solubility and leading in turn to the appearance of agglomerates during formulation and to variable ink absorption. On the other hand, at more than 90 wt %, foaming increases during formulation, bubbles arise during pigment dispersion, and coating defects such as pinholes and unevenness occur.

In the practice of the invention, it is desirable for components A and B to be used in a combined amount of 100 wt %. However, use may also be made of, as a third component (component C), ion-exchanged water or a water-soluble organic solvent. Illustrative examples of the latter include ethylene glycol, diethylene glycol, triethylene glycol, tetraethylene glycol, polyethylene glycol, propylene glycol, 1,3-propanediol, 1,4-butanediol and glycerol. Component C may be used in an amount of 0 to 25 wt %, and preferably 5 to 20 wt %, insofar as the objects of the invention are attainable.

The surfactant composition of the invention can be obtained by a known method of mixture and preparation, such as one that involves the use of a propeller-type stirrer to mix together the above components. When components which are solid at normal temperature are used, if necessary, mixture may be carried out after warming.

It is critical that a 0.1 wt % aqueous solution of the resulting water-soluble surfactant composition have both a contact angle of at most 60 degrees, preferably 10 to 50 degrees, and more preferably 15 to 40 degrees; and also a dynamic surface tension of at not more than 50 mN/m, preferably 10 to 50 mN/m, and even more preferably 25 to 45 mN/m. If a 0.1 wt % aqueous solution of the surfactant composition has a contact angle 30 seconds after droplet deposition of more than 60 degrees, when the composition is incorporated within an ink or a paper coating, for example, ink absorption will be poor, causing the ink to run. Likewise, if a 0.1 wt % aqueous solution of the surfactant composition has a dynamic surface tension at 1 Hz and 10 Hz which is greater than 50 mN/m, when printing is carried out using a printing apparatus such as a printer, the ink will run due to crawling and poor penetration.

In the practice of the invention, the contact angle, which is determined using a CA-D contact angle meter available from Kyowa Interface Science Co., Ltd., is the value measured 30 seconds after depositing a droplet of a 0.1 wt % aqueous solution of the surfactant composition. The dynamic surface tension refers to the values measured at 1 Hz and 10 Hz using a Kruss BP-2 bubble pressure dynamic surface tensiometer (Krüss GmbH).

When the water-soluble surfactant composition of the invention is formulated in an ink or paper coating, for example, the resulting system has a low dynamic surface tension and thus exhibits excellent wettability, penetrability, foam inhibition and dispersibility. In addition, it is compatible with recent environmental concerns, and moreover causes no adverse effects such as nozzle clogging or uneven coating due to the adherence of surfactant residues to equipment used in printing or coating.

When the water-soluble surfactant composition of the invention is used to manufacture ink or as an aqueous wetting agent in paper coatings, it is desirable to include the surfactant composition in an amount, based on the overall amount of ink or paper coating, of preferably 0.05 to 10 wt %, and more preferably 0.05 to 5 wt %.

EXAMPLES

The following examples, wherein all parts and percents are by weight, are provided by way of illustration and not by way of limitation.

Example 1

A vessel equipped with a propeller-type stirrer was charged with 55 parts of 2,4,7,9-tetramethyl-5-decen-4,7-diol, then 45 parts of polyoxyalkylene alkyl ether available from Dai-ichi Kogyo Seiyaku Co., Ltd. under the trade name Noigen ET-116B was gradually added and mixed under stirring. The mixture was then stirred continuously for 2 hours, and subsequently cooled to room temperature. After cooling, the mixture was filtered by passing it through 200-mesh filter fabric, yielding a surfactant composition M-1.

Next, 0.1 part of composition M-1 was added to 100 parts of ion-exchanged water and stirred with a magnetic stirrer to form a 0.1% aqueous solution. The appearance of the aqueous solution was visually examined, and its contact angle, dynamic surface tension and static surface tension were measured. The results are shown in Table 3.

An ink and a paper coating were each formulated as described below using this surfactant composition. The ink formulation was measured for print density, dot diameter, print resolution, ink absorption, and nozzle clogging. The paper coating was measured for crawling, foam volume and coating evenness. Test results for both the ink formulation and the paper coating are shown in Table 5.

[Ink Formulation]

Five parts of dye available from Ciba-Geigy Japan Ltd. under the trade name Cibafix Direct Black 19 was gradually added to 70 parts of ion-exchanged water under stirring with a propeller-type stirrer. Next, 1 part of the surfactant composition M-1, 10 parts of polyethylene glycol and 15 parts of glycerol were added, and the system was stirred for 1 hour, giving a black (B) ink A-1.

Magenta (M), cyan (C) and yellow (Y) inks were each prepared in the same way as described above, but using respectively the following dyes instead of the black dye: Cibafix Direct Red 9, Cibafix Direct Blue 86 and Cibafix Direct Yellow 23.

[Paper Coating Formulation]

A paper coating B-1 was prepared by adding 1 part of surfactant composition M-1 to 100 parts of a paper coating emulsion available from Nisshin Chemical Industry Co., Ltd. under the trade name Vinyblan 2750, and stirring for 30 minutes with a propeller-type stirrer.

The properties of the respective formulations were measured as described below.

Evaluation of Aqueous Solution of Surfactant Composition (1) Appearance of Aqueous Solution:

The above 0.1% aqueous solution of the surfactant composition was rated as follows for appearance and the presence of insoluble matter.

Good: Solution was clear and free of insoluble matter
Fair: Solution was cloudy, but free of insoluble matter
Poor: Some insoluble matter was present
Very Poor (VP): Substantially no dissolution occurred (2) Contact Angle:

The contact angle 30 seconds after depositing a droplet of the 0.1% aqueous solution of the surfactant composition was measured using a CA-D contact angle meter manufactured by Kyowa Interface Science Co., Ltd.

(3) Dynamic Surface Tension:

The dynamic surface tension at 1 Hz and 10 Hz of the 0.1% aqueous solution of the surfactant composition was measured with a Kruss BP-2 bubble pressure dynamic tensiometer (Krüss GmbH).

(4) Static Surface Tension:

The static surface tension of a 0.1% aqueous solution of the surfactant composition was measured with an ESB-V surface tensiometer (Kyowa Interface Science Co., Ltd.).

Evaluation of Ink (1) Print Density:

The dot density of dots printed with black (B) ink on a Canon Printer BJC455J was measured with a Sakura microdensitometer (PDM-5, manufactured by Sakura Seiki Co., Ltd.).

(2) Dot Diameter:

Dots printed with black (B) ink on a Canon Printer BJC455J were enlarged 100 times and the dot diameters measured.

(3) Resolution of Printed Image:

Black (B) ink was printed solid with a Canon Printer BJC455J, and the resolution was measured using a Macbeth densitometer (RD-918, manufactured by Macbeth, Division of Kollmorgen). Measurement was carried out in the same way for magenta (M), cyan (C) and yellow (Y) inks.

(4) Ink Absorption:

Black (B), magenta (M), cyan (C) and yellow (Y) inks were applied at the same time to the same place using a Canon Printer BJC455J. One second later, the paper pressing plate was rubbed across the printed surface, and the degree of ink smudging was rated according to the following criteria.
   Good: No smudging in unprinted areas
   Fair: Limited smudging
   Not Good (NG): Severe smudging (5) Nozzle Clogging:

The ink was loaded into a Canon Printer BJC455J and left to stand at 60° C. for 7 days, following which a printer cleaning operation was carried out and repeated until the printing performance recovered to a level comparable with that for ink which had not been allowed to stand. Ratings were assigned as follows based on the number of cleaning operations required.
   Good: Printing performance recovered after a single cleaning operation
   Fair: Recovered after 2 to 5 cleaning operations
   Not Good (NG): Recovery took 6 or more cleaning operations Evaluation of Paper Coating (1) Crawling:

The paper coating was applied at a rate of 50 m/min using a Gravo-Proof printability tester manufactured by Nissio Gravure Co., Ltd. Printed surface defects such as crawling were visually examined and rated as follows.
   Good: No crawling or pinholing
   Fair: Some crawling and pinholing
   Not Good (NG): Considerable crawling and pinholing (2) Foam Volume:

A sample was prepared by diluting the paper coating to a coating/water ratio of 1:2, then 20 ml of the sample was placed in a 100 ml measuring cylinder and shaken for 1 minute on a shaker at 180 rpm/min. The volume of foam in milliliters was measured, both immediately after shaking ended and 5 minutes after shaking.

(3) Coating Evenness:

The paper coating was applied using a Gravo-Proof printability tester manufactured by Nissio Gravure Co., Ltd., then left to stand for one day, and again applied at a coating speed of 50 m/min. The coating evenness on the printing surface early during coating was rated as follows.
   Good: Coating appears uniform
   Fair: Some unevenness is observable
   Not Good (NG): Coating is very uneven Examples 2 to 9, Comparative Examples 1 to 8

Surfactant compositions M-2 to M-17 were prepared in the same way as in Example 1 by stirring and mixing the ingredients shown in Tables 1 and 2 in the indicated proportions (%). Solid ingredients were warmed to 50° C. prior to admixture. Table 1 also includes the proportions used in the surfactant composition prepared in Example 1.

As in Example 1, a 0.1% aqueous solution was prepared in each of the above examples, and the aqueous solution was similarly evaluated. Those results are shown below in Tables 3 and 4. In addition, inks and paper coatings were prepared and evaluated in each of these examples in the same way as in Example 1 above. Those results are given in Tables 5 and 6. Ink formulations A-2 to A-17 and paper coatings B-2 to B-17 in Tables 5 and 6 were obtained using the respective surfactant compositions M-2 to M-17.

Comparative Example 9

In this example, the commercial product Dapro W-77, a succinate surfactant available under this trade name from Elementis Japan KK, was used as the surfactant composition and evaluations were carried out in the same way as in Example 1. The results are shown in Tables 4 and 6. This commercial surfactant was used to obtain ink formulation A-18 and paper coating B-18 in Table 6.

TABLE 1

|  |  | Example |  |  |  |  | Comparative Example |  |  |  |  |
|---|---|---|---|---|---|---|---|---|---|---|---|
|  |  | 1 | 2 | 3 | 4 | 5 | 1 | 2 | 3 | 4 | 5 |
| Surfactant composition |  | M-1 | M-2 | M-3 | M-4 | M-5 | M-6 | M-7 | M-8 | M-9 | M-10 |
| Component A | A-1 | 55 |  |  | 80 |  |  |  |  | 5 |  |
|  | A-2 |  | 55 |  |  | 20 |  |  | 55 |  | 95 |
|  | A-3 |  |  | 80 |  |  |  |  |  |  |  |
|  | A-7 |  |  |  |  |  | 55 |  |  |  |  |
|  | A-8 |  |  |  |  |  |  | 55 |  |  |  |
| Component B | B-1 | 45 |  |  | 15 |  | 45 |  |  | 95 |  |
|  | B-2 |  | 25 |  |  |  |  | 25 |  |  | 5 |
|  | B-3 |  |  | 15 |  |  |  |  |  |  |  |
|  | B-4 |  |  |  |  | 70 |  |  |  |  |  |
|  | B-5 |  |  |  |  |  |  |  | 25 |  |  |
| Component C | Ethylene glycol |  | 20 |  |  |  |  | 20 |  |  |  |
|  | Propylene glycol |  |  | 5 |  |  |  |  | 20 |  |  |
|  | Polyethylene glycol |  |  |  | 5 |  |  |  |  |  |  |
|  | Glycerol |  |  |  |  | 5 |  |  |  |  |  |
|  | Ion-exchanged water |  |  |  |  | 5 |  |  |  |  |  |

TABLE 2

|  |  | Example | | | | Comparative Example | | |
|---|---|---|---|---|---|---|---|---|
|  |  | 6 | 7 | 8 | 9 | 6 | 7 | 8 |
| Surfactant composition |  | M-11 | M-12 | M-13 | M-14 | M-15 | M-16 | M-17 |
| Component A | A-4 | 50 |  |  |  | 20 |  |  |
|  | A-5 |  | 50 |  |  |  | 3 |  |
|  | A-6 |  |  | 75 |  |  |  | 98 |
| Component B | B-1 | 50 |  |  |  | 50 |  |  |
|  | B-2 |  | 30 |  |  |  | 97 | 2 |
|  | B-3 |  |  | 20 |  |  |  |  |
|  | B-4 |  |  |  | 75 |  |  |  |
|  | B-5 |  |  |  |  | 30 |  |  |
| Component C | Ethylene glycol |  | 20 |  |  |  |  |  |
|  | Propylene glycol |  |  |  |  | 20 |  |  |
|  | Polyethylene glycol |  |  |  | 5 |  |  |  |
|  | Glycerol |  |  |  | 5 |  |  |  |

Component A
A-1: 2,5,8,11-tetramethyl-6-dodecen-5,8-diol
A-2: 2,4,7,9-tetramethyl-5-decen-4,7-diol
A-3: 3,6-dimethyl-4-octen-3,6-diol
A-4: 2,5,8,11-tetramethyl-6-dodecan-5,8-diol
A-5: 2,4,7,9-tetramethyl-5-decan-4,7-diol
A-6: 3,6-dimethyl-4-octan-3,6-diol
A-7: Surfynol 104 (trade name for 2,4,7,9-tetramethyl-5-decyn-4,7-diol produced by Air Products and Chemicals, Inc.)
A-8: Surfynol 465 (trade name for ethoxylated form of Surfynol 104 available from Air Products and Chemicals, Inc.; moles of ethylene oxide added=10)

Component B
B-1: Noigen ET-116B (available from Dai-ichi Kogyo Seiyaku Co., Ltd.; trade name for $RO(C_2H_4O)_7(C_3H_6O)_{4.5}H$, where R represents $C_{12}$ and $C_{14}$ alkyls; HLB, 12.0)
B-2: Noigen DL-0415 (available from Dai-ichi Kogyo Seiyaku Co., Ltd.; trade name for $RO(C_2H_4O)_a(C_3H_6O)_b(C_2H_4O)_c(C_3H_6O)_dH$, where R represents $C_{12}$ and $C_{13}$ alkyls, a+c=15, and b+d=4; HLB, 15.0)
B-3: Nikkol PBC-33 (available from Nikko Chemicals Co., Ltd.; trade name for $CH_3(CH_2)_{14}CH_2O(C_3H_6O)_4(C_2H_4O)_{10}H$; HLB, 10.5)
B-4: Nikkol PBC-31 (available from Nikko Chemicals Co., Ltd.; trade name for $CH_3(CH_2)_{14}CH_2O(C_3H_6O)_4(C_2H_4O)H$; HLB, 9.5)
B-5: Noigen DH-0300 (available from Dai-ichi Kogyo Seiyaku Co., Ltd.; trade name for $C_{14}H_{29}O(C_2H_4O)_2H$; HLB, 4.0)

TABLE 3

|  | Example | | | | | Comparative Example | | | | |
|---|---|---|---|---|---|---|---|---|---|---|
|  | 1 | 2 | 3 | 4 | 5 | 1 | 2 | 3 | 4 | 5 |
| Composition formulation No. | M-1 | M-2 | M-3 | M-4 | M-5 | M-6 | M-7 | M-8 | M-9 | M-10 |
| Appearance of aqueous solution | good | good | good | good | good | good | good | VP | good | VP |
| Contact angle (degrees) | 20 | 28 | 38 | 17 | 32 | 29 | 45 | 46 | 72 | 28 |
| Dynamic surface tension (mN/m) 1 Hz | 27.5 | 30.9 | 38.5 | 26.5 | 34.5 | 28.3 | 41.5 | 39.5 | 52.4 | 30.4 |
| 10 Hz | 32.3 | 33.8 | 42.0 | 31.0 | 39.1 | 33.6 | 46.5 | 45.6 | 59.6 | 33.4 |
| Static surface tension (mN/m) | 27.0 | 30.1 | 37.9 | 25.9 | 33.8 | 28.2 | 40.3 | 38.5 | 52.0 | 29.8 |

TABLE 4

|  | Example | | | | Comparative Example | | | |
|---|---|---|---|---|---|---|---|---|
|  | 6 | 7 | 8 | 9 | 6 | 7 | 8 | 9 |
| Composition formulation No. | M-11 | M-12 | M-13 | M-14 | M-15 | M-16 | M-17 | Commercial product |
| Appearance of aqueous solution | good | good | good | good | VP | good | VP | good |
| Contact angle (degrees) | 19 | 29 | 36 | 34 | 49 | 76 | 32 | 28 |
| Dynamic surface tension (mN/m) 1 Hz | 27.0 | 30.2 | 39.1 | 39.1 | 40.9 | 53.5 | 32.7 | 28.6 |
| 10 Hz | 31.5 | 33.1 | 42.6 | 40.2 | 47.2 | 60.5 | 36.0 | 52.0 |
| Static surface tension (mN/m) | 26.9 | 28.5 | 38.5 | 34.5 | 40.2 | 52.6 | 31.5 | 28.2 |

Commercial Product: Dapro W-77 (a succinate surfactant available under this trade name from Elementis Japan KK)

TABLE 5

|  | Example | | | | | Comparative Example | | | | |
|---|---|---|---|---|---|---|---|---|---|---|
|  | 1 | 2 | 3 | 4 | 5 | 1 | 2 | 3 | 4 | 5 |
| Ink formulation No. | A-1 | A-2 | A-3 | A-4 | A-5 | A-6 | A-7 | A-8 | A-9 | A-10 |
| Print density | 1.03 | 1.02 | 0.98 | 1.04 | 0.98 | 1.02 | 0.95 | 0.94 | 0.73 | 0.96 |
| Dot diameter | 229 | 232 | 236 | 228 | 239 | 234 | 242 | 240 | 285 | 246 |
| Resolution (B) | 1.33 | 1.45 | 1.47 | 1.35 | 1.30 | 1.33 | 1.25 | 1.19 | 1.13 | 1.30 |
| of printed (M) | 1.48 | 1.49 | 1.53 | 1.49 | 1.45 | 1.47 | 1.40 | 1.25 | 1.20 | 1.40 |
| image (C) | 1.80 | 1.82 | 1.85 | 1.83 | 1.75 | 1.81 | 1.64 | 1.28 | 1.24 | 1.71 |
| (Y) | 1.45 | 1.47 | 1.48 | 1.43 | 1.42 | 1.46 | 1.32 | 1.24 | 1.18 | 1.18 |
| Ink absorption | good | good | good | good | good | good | good | NG | NG | good |
| Nozzle clogging | good | good | good | good | good | NG | NG | NG | good | NG |
| Paper coating No. | B-1 | B-2 | B-3 | B-4 | B-5 | B-6 | B-7 | B-8 | B-9 | B-10 |
| Crawling | good | good | good | good | good | good | good | NG | NG | NG |
| Foam Immediately | 3 | 4 | 5 | 2 | 5 | 3 | 7 | 8 | 25 | 3 |
| volume After 5 minutes | 0 | 0 | 0 | 0 | 2 | 0 | 2 | 2 | 24 | 0 |
| (ml) | | | | | | | | | | |
| Coating evenness | good | good | good | good | good | NG | NG | NG | NG | NG |

TABLE 6

|  | Example | | | | Comparative Example | | | |
|---|---|---|---|---|---|---|---|---|
|  | 6 | 7 | 8 | 9 | 6 | 7 | 8 | 9 |
| Ink formulation No. | A-11 | A-12 | A-13 | A-14 | A-15 | A-16 | A-17 | A-18 |
| Print density | 1.01 | 1.04 | 1.01 | 1.01 | 0.91 | 0.72 | 0.97 | 1.01 |
| Dot diameter | 217 | 220 | 222 | 226 | 243 | 282 | 243 | 270 |
| Resolution (B) | 1.46 | 1.53 | 1.55 | 1.50 | 1.16 | 1.14 | 1.31 | 1.14 |
| of printed (M) | 1.55 | 1.61 | 1.61 | 1.56 | 1.24 | 1.21 | 1.42 | 1.14 |
| image (C) | 1.91 | 1.94 | 1.96 | 1.87 | 1.29 | 1.23 | 1.73 | 1.18 |
| (Y) | 1.57 | 1.56 | 1.59 | 1.52 | 1.23 | 1.19 | 1.19 | 1.36 |
| Ink absorption | good | good | good | good | NG | NG | good | NG |
| Nozzle clogging | good | good | good | good | NG | good | NG | good |
| Paper coating No. | B-11 | B-12 | B-13 | B-14 | B-15 | B-16 | B-17 | B-18 |
| Crawling | good | good | good | good | NG | NG | NG | good |
| Foam Immediately | 2 | 4 | 6 | 6 | 8 | 30 | 4 | 46 |
| volume After 5 minutes | 0 | 0 | 0 | 2 | 1 | 29 | 0 | 45 |
| (ml) | | | | | | | | |
| Coating evenness | good | good | good | good | NG | NG | NG | NG |

Japanese Patent Application Nos. 2003-147213 and 2004-043954 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A water-soluble surfactant composition comprising:
   (A) 10 to 90 wt % of at least one aliphatic diol selected from among compounds of formula (1)

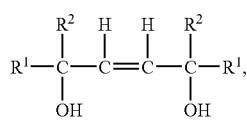
(1)

wherein $R^1$ and $R^2$ are each an alkyl of 1 to 5 carbons, and compounds of formula (2)

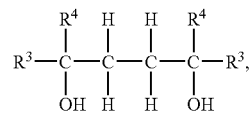
(2)

wherein $R^3$ and $R^4$ are each an alkyl of 1 to 5 carbons, and
   (B) 10 to 90 wt % of at least one polyoxyalkylene alkyl ether having a hydrophilic-lipophilic balance of 8 to 19 selected from among compounds of formula (3)

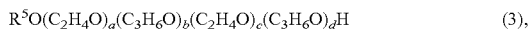
(3), wherein $R^5$ is an alkyl of 1 to 20 carbons, the letter a is an integer from 1 to 20, and b, c and d are each 0 or an integer from 1 to 20, and compounds of formula (4)

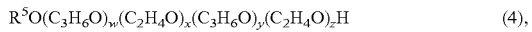
(4), wherein $R^5$ is as defined above, the letter w is an integer from 1 to 20, and x, y and z are each 0 or an integer from 1 to 20;

which composition, when prepared as a 0.1 wt % aqueous solution thereof, has a contact angle 30 seconds after droplet deposition of at most 60 degrees and a dynamic surface tension at 1 Hz and 10 Hz of at most 50 mN/m each.

* * * * *